United States Patent
Kareco et al.

(10) Patent No.: US 10,393,553 B2
(45) Date of Patent: Aug. 27, 2019

(54) MODULAR SENSOR SYSTEM

(71) Applicant: IDEX Health & Science LLC, Oak Harbor, WA (US)

(72) Inventors: Kostandin Kareco, Cheshire, CT (US); Lisa Shinn, Anacortes, WA (US); Andrew Shaw, West Hartford, CT (US); Mark Joiner, Bristol, CT (US); Troy Sanders, Oak Harbor, WA (US)

(73) Assignee: IDEX Health & Science LLC, Oak Harbor, WA (US)

( * ) Notice: Subject to any disclaimer, the term of this patent is extended or adjusted under 35 U.S.C. 154(b) by 466 days.

(21) Appl. No.: 15/053,588

(22) Filed: Feb. 25, 2016

(65) Prior Publication Data

US 2017/0248449 A1    Aug. 31, 2017

(51) Int. Cl.
    *G01D 11/24*     (2006.01)
    *B33Y 80/00*     (2015.01)
    *G01L 19/14*     (2006.01)
    *B29L 31/34*     (2006.01)
    *B29C 70/70*     (2006.01)

(52) U.S. Cl.
    CPC .......... *G01D 11/245* (2013.01); *B33Y 80/00* (2014.12); *G01L 19/14* (2013.01); *B29C 70/70* (2013.01); *B29L 2031/34* (2013.01)

(58) Field of Classification Search
    CPC .......... G01L 19/14; B33Y 80/00; G01D 11/24
    See application file for complete search history.

(56) References Cited

U.S. PATENT DOCUMENTS

| | | |
|---|---|---|
| 3,713,341 A | 1/1973 | Madsen et al. |
| 3,880,151 A | 4/1975 | Nilsson et al. |
| 4,920,272 A | 4/1990 | Yoder |
| 4,920,972 A | 5/1990 | Frank et al. |
| 5,525,303 A | 6/1996 | Ford et al. |
| 5,533,544 A | 7/1996 | Good et al. |
| 5,693,887 A | 12/1997 | Englund et al. |

(Continued)

FOREIGN PATENT DOCUMENTS

WO    2016010251 A1    1/2016

OTHER PUBLICATIONS

International Search Report and Written Opinion; PCT/US2017/018207 dated Jun. 15, 2017.

*Primary Examiner* — Jamel E Williams
(74) *Attorney, Agent, or Firm* — Vinson & Elkins, L.L.P.

(57) ABSTRACT

A modular sensor for a fluidic analysis or biological assay system, such as an analytical instrument system, and other systems involving fluid flow, includes a cap and base which include one or more sensors therein, which may be a flow sensor, a pressure sensor, a temperature sensor, a pH sensor, and so forth. The base of the modular sensor includes input and output ports for fluid passageways therethrough to provide a fluid pathway which is at least partially adjacent to or near the sensor. The modular sensor may also include an adapter having ports adapted to sealingly engage with fitting assemblies. The sensor may be partially or wholly encapsulated as part of the base of the modular sensor. The modular sensor's base and cap are adapted so that a first modular sensor can be disconnected and removed from a fluidic system and a second modular sensor can be added and connected to the system in place of the first modular sensor. The modular sensor is adapted to be interchangeable with one or more other modular sensors.

25 Claims, 14 Drawing Sheets

(56) References Cited

U.S. PATENT DOCUMENTS

| | | |
|---|---|---|
| 5,730,943 A | 3/1998 | Ford et al. |
| 5,852,244 A | 12/1998 | Englund et al. |
| 5,869,766 A | 2/1999 | Cucci et al. |
| 6,095,572 A | 8/2000 | Ford et al. |
| 6,622,564 B2 | 9/2003 | Imai |
| 6,948,373 B2 | 9/2005 | Imai |
| 7,905,140 B2 | 3/2011 | Kanne |
| 8,312,774 B2 | 11/2012 | Bentley et al. |
| 2002/0078744 A1 | 6/2002 | Gehman et al. |
| 2002/0095993 A1 | 7/2002 | Ferris |
| 2003/0049877 A1 | 3/2003 | Mayer et al. |
| 2004/0255645 A1 | 12/2004 | Imai |
| 2010/0224543 A1 | 9/2010 | Ellis et al. |

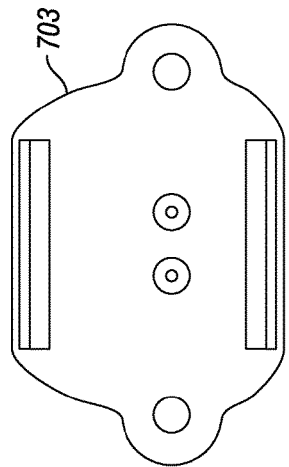
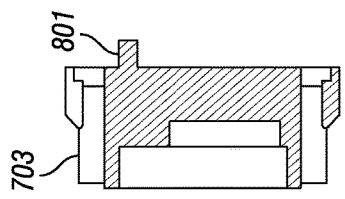
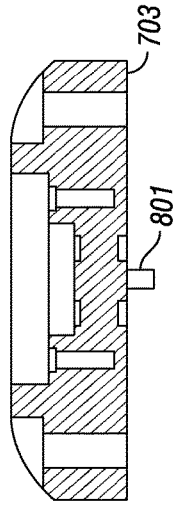
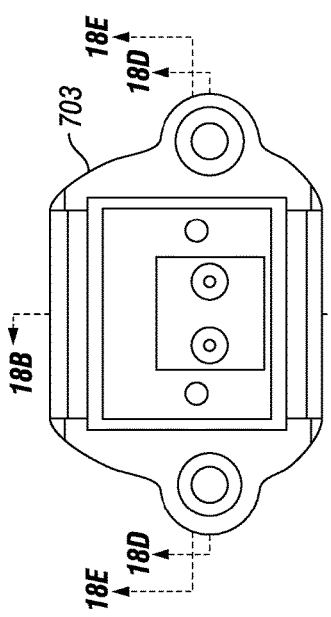
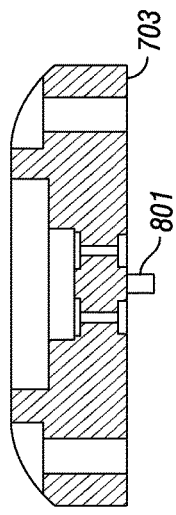

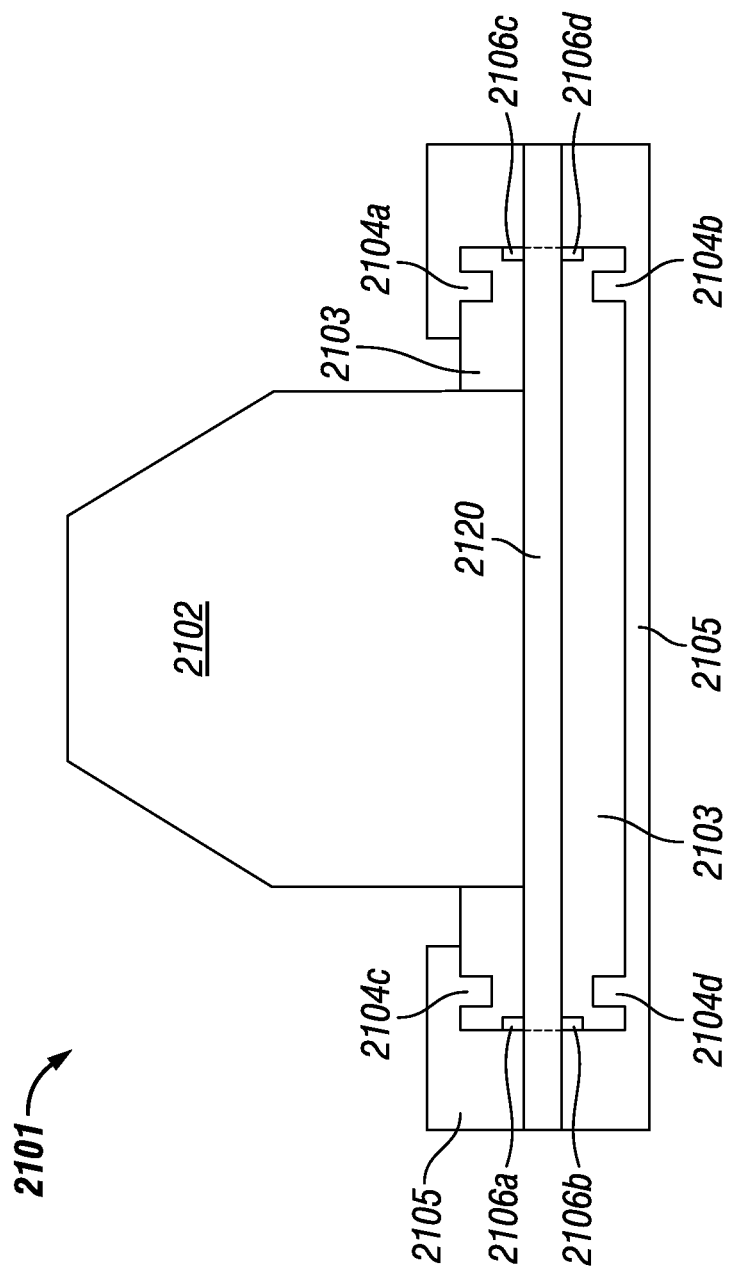

MODULAR SENSOR SYSTEM

CROSS-REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

FIELD OF THE INVENTION

The invention relates generally to the field of sensors for use in a variety of fluidic-based analysis systems and biological assay systems, such as analytical and scientific instruments and systems, and more particularly to a type of modular sensor system for easy connection and disconnection in such a fluidic system or instrument, such as an analytical instrument system.

BACKGROUND OF THE INVENTION

A variety of types of sensors have been developed for use in connection with fluidic systems and instruments, such as fluidic-based analysis and biological assay systems and analytical instrument systems. Although it will be appreciated that sensors can be used in a wide variety of different types of fluidic systems and instruments, and in a variety of applications in such systems, for convenience this disclosure will use as an example various types of analytical instrument ("AI") systems in which sensors may be used, such as liquid and gas chromatography systems, mass spectroscopy systems, and the like. Conventional AI systems also include systems for ion chromatography (IC), high-pressure liquid chromatography, ultra-high pressure liquid chromatography, mass spectrometry systems, micro-flow chromatography systems, nanoflow and nano-scale chromatography systems, capillary electrophoresis systems, reverse-gradient chromatography systems, and systems which include or combine one or more of the foregoing. However, those skilled in the art will appreciate that the discussion of AI systems and instruments is merely for purposes of illustration, and that in addition to AI systems and instruments, sensors may be useful in connection with various types of scientific systems, including for example, hematological systems and instruments, immunoassay instruments and systems, gene sequencing instruments and systems and the like.

In practice, various components in an AI system may be connected by an operator to perform a given task. For example, an operator will select an appropriate mobile phase and column, and then connect a supply of the selected mobile phase and a selected column to a LC system before operation. In order to be suitable for LC applications in this example, each connection must be able to withstand the typical operating pressures of the LC system. If the connection is too weak, it may leak. Because the types of solvents that are sometimes used as the mobile phase are often toxic and because it is often expensive to obtain and/or prepare many samples for use, any such connection failure is a serious concern.

It is fairly common for an operator to connect or disconnect various components in an AI system. Those skilled in the art will appreciate that an "operator" in connection with this disclosure may be an operator of a system or instrument, a maintenance or repair technician, or may be someone who otherwise uses the system or instrument. Given the importance of leak-proof connections in AI systems, the operator must take time to be sure the connection is sufficient each time one is made. Adding, removing, or replacing one or more components in a given AI system may occur several times in a day. Moreover, the time involved in disconnecting and then connecting a given component is unproductive because the AI system is not in use and the operator is engaged in plumbing the system instead of preparing samples or other more productive activities. Hence, the addition, removal or replacement of a component in a conventional AI system can involve a great deal of wasted time and inefficiencies.

In many applications using selector/injector valves to direct fluid flows, and in particular in liquid chromatography, the volume of fluids is small. This is particularly true when liquid chromatography is being used as an analytical method as opposed to a preparative method. Such methods often use capillary columns and are generally referred to as capillary chromatography. In capillary chromatography, it is often desired to minimize the internal volume of the selector or injector valve. One reason for this is that a valve having a large volume will contain a relatively large volume of liquid, and when a sample is injected into the valve the sample will be diluted, decreasing the resolution and sensitivity of the analytical method.

Micro-fluidic analytical processes also involve small sample sizes. As used herein, sample volumes considered to involve micro-fluidic techniques can range from as low as volumes of only several picoliters or so, up to volumes of several milliliters or so, whereas more traditional AI techniques, for example, historically often involved samples of about one microliter to about 100 milliliters in volume. Thus, the micro-fluidic techniques described herein involve volumes one or more orders of magnitude smaller in size than traditional AI techniques. Micro-fluidic techniques can also be expressed as those involving fluid flow rates of about 0.5 mL/minute or less.

As noted, liquid chromatography (as well as other analytical instrument) systems typically include several components. For example, such a system may include a pump; an injection valve or autosampler for injecting the analyte; a precolumn filter to remove particulate matter in the analyte solution that might clog the column; a packed bed to retain irreversibly adsorbed chemical material; the LC column itself; and a detector that analyzes the carrier fluid as it leaves the column. Ion chromatography may also utilize a suppressor column to facilitate detection dynamic range. These various components may typically be connected by a miniature fluid conduit, or tubing, such as metallic or polymeric tubing (for ion chromatography), usually having an internal diameter of 0.003 to 0.040 inch.

All of these various components and lengths of tubing are typically interconnected by threaded fittings. Fittings for connecting various LC system components and lengths of tubing are disclosed in prior patents, for example, U.S. Pat.

Nos. 5,525,303; 5,730,943; and 6,095,572, the disclosures of which are all incorporated by reference as if fully set forth herein. Often, a first internally threaded fitting seals to a first component with a ferrule or similar sealing device. The first fitting is threadedly connected through multiple turns by hand or by use of a wrench or wrenches to a second fitting having a corresponding external fitting, which is in turn sealed to a second component by a ferrule or other seal. Disconnecting these fittings for component replacement, maintenance, or reconfiguration often requires the use of a wrench or wrenches to unthread the fittings. Although a wrench or wrenches may be used, other tools such as pliers or other gripping and holding tools are sometimes used. In addition, the use of such approaches to connect components of an LC system often results in deformation or swaging of a ferrule used to provide a leak proof seal of tubing to a fitting or component. This often means that the ferrule and tubing connection, once made, cannot be reused without a risk of introducing dead volumes into the system. In addition, such approaches may involve crushing or deformation of the inner diameter of the tubing, which may adversely affect the flow characteristics and the pressures of the fluid within the tubing.

In such systems, it is often desirable for an operator to monitor or determine various operating parameters, such as pressure of the fluid as it flows in a particular part of the system, flow rate in a particular part of the system, temperature of the fluid in a particular part of the system, and so forth. For example, such detection and monitoring can help avoid blowouts or bursting of fluidic connections or components, such as valves and tubing. In addition, such detection and monitoring is useful in connection with detecting leaks or blockages in the system, which can result in savings with respect to samples and reagents. Since many samples are small and sometimes irreplaceable, such savings can be critical. Moreover, such detection and monitoring can assist in detecting bubbles in the fluid flowpath before they affect or impact the system performance, and in general, such sensors can be used to provide essentially real-time feedback and information regarding system performance, which an operator can then use to make adjustments as desired to enhance and optimize system performance.

Conventional sensors for sensing such parameters and providing information regarding the same have been developed. For example, a liquid flow sensor is commercially available from Sensirion AG of Staefa, Switzerland, and provides a flow sensor with a flow channel in a planar substrate. This sensor allows for biocompatible operations. An example of such a sensor is disclosed in U.S. Pat. No. 7,905,140, issued on Mar. 15, 2011, to Kanne, and titled "Device with Flow Sensor for Handling Fluids." Such a sensor typically needs some sort of packaging before it can be used in a flowpath or requires assembly and connection with a manifold for use. Such packaging, assembly and connection takes time, skill, and is often difficult and cumbersome. Those skilled in the art will appreciate that other flow sensors and other sensors (e.g., such as for sensing temperature, pressure, or the like) are also commercially available.

While such conventional sensors can be useful, the mounting of such a sensor, and its integration into a system for application, are typically left to the end user. Generally, it tends to be difficult and time-consuming for an end user to integrate such a sensor into a usable package and connect it for use in a fluidics system. Typically, an end user would need to assemble the sensor with several other components to properly install and use the sensor in a fluidics system. In many situations, the sensor, once installed in a system, cannot be reused in another part of the system or in another system. Moreover, once installed and connected, such sensors may be difficult and time-consuming to disconnect. Because such systems are typically expensive, anything that causes or involves downtime of the system while a component such as a sensor is connected or disconnected, can result in substantial costs. In addition, such sensors typically do not provide much variation as to their size, shape, and fluid path, which means that mounting the sensor on any holding device, or connecting the sensor in a system with other components, may be difficult and time-consuming because the size, shape, and/or fluid path of the sensor that is commercially available may not match the portion of the system for which the sensor is intended to be used.

Many conventional sensors typically are used in only a single-ended application, such as the placement of a sensor adjacent or near a branch of the fluid flow system which is not swept by the main flow of the fluid. For example, this occurs when the sensor is placed adjacent or near a fluid flow path that is essentially a branch off of the main or primary fluid flow path. One potential problem with such sensors is that they often involve carryover issues, such as the addition of potential deadspace or dead volume into the flow path of a system, and as noted often are not swept by the main flow of the fluid. Such dead volume is problematic for a number of reasons, including the potential to contaminate samples as well as affect the outcome or results of successive tests on different samples. Moreover, the dead volume allows the possibility that the system can trap gas bubbles in a pocket within the system, and such bubbles may cause a variety of problems, such as by increasing the noise in the results and measurements obtained from the system and by making it difficult to ensure that the system results are precise and accurate.

A number of conventional approaches have been tried with respect to providing pressure sensors for use in various applications. For example, U.S. Pat. No. 5,852,244, issued on Dec. 22, 1998 and titled "Non-Fluid Conducting Pressure Sensor Module Having Non-Contaminating Body and Isolation Member," describes a pressure sensor configuration which may be positioned in-line with a fluid path containing corrosive materials, such as those used to manufacture semiconductors. Similarly, U.S. Pat. No. 5,869,766, issued on Feb. 9, 1999, and titled "Non-Contaminating Pressure Transducer Module," describes the use of an isolation member to isolate the pressure sensor from exposure to ultra high purity fluids.

Another example of a proposed inline pressure sensor can be found in U.S. Pat. No. 6,948,373, issued on Sep. 27, 2005, and titled "Inline Pressure Sensor." In this particular patent, a pressure sensing section and a sensor element are provided in a housing which has two ports and forms a flow path that can be considered convex, with the goal of minimizing dead volume.

Another approach can be found in U.S. Pat. No. 3,880,151, issued on Apr. 29, 1975, and titled "Pressure Receiver." In this patent, a pressure receiver for determining intravascular pressure is described, which includes a chamber having a truncated or frusto-conical cone and having a conical member extending in an opposite and symmetrical direction. In U.S. Pat. No. 4,920,272, issued on May 1, 1990, and titled "Gel-Filled Blood Pressure Transducer," another pressure transducer for measuring blood pressure is provided. In this latter patent, the pressure transducer includes a body having a recess with an opening covered by a flexible diaphragm, with the sensor placed over a hole opposite the diaphragm.

The sensor includes a dielectric gel in the recess to transmit to the sensor the variations in pressure imparted to the diaphragm.

Applicants hereby incorporate by reference as if fully set forth herein the previously discussed U.S. Pat. Nos. 3,880,151, 4,920,972, 5,852,244, 5,899,766, and 6,948,373.

Those skilled in the art will appreciate that the modular sensor system disclosed below overcomes a number of disadvantages of conventional sensors and housings for same, and will appreciate that advantages of the modular sensor as disclosed below.

SUMMARY OF THE INVENTION

The present disclosure involves a sensor module for a fluidic analysis or biological assay system, such as an analytical instrument system, and other systems involving fluid flow, and methods of using the same. In certain embodiments, the sensor module includes a cap and base which include one or more sensors therein, which may be a flow sensor, a pressure sensor, a temperature sensor, a pH sensor, and so forth. The base of the sensor module includes input and output openings (such as ports, with or without threads) for fluid passageways therethrough to provide a fluid pathway which is at least partially adjacent to or near the sensor. The sensor module may also attach to an adapter having ports specially adapted to sealingly engage with various types of fitting assemblies. The sensor may be partially or wholly encapsulated as part of the cap of the sensor module. The sensor module's base and cap are adapted so that a first sensor module (which may, for example, contain a first sensor for sensing a first parameter) can be disconnected and removed from a fluidic system and a second sensor module (which may, for example, have a second sensor which is the same or different from the first sensor and which may sense the same or a different parameter as the first sensor) can be added and connected to the system in place of the first sensor module. In some situations, the second sensor module may replace the first sensor module in the same physical location or it may replace the first sensor module in essentially the same location in the fluid flowpath of the system, albeit not in the same physical location, as the first sensor module. The sensor module may be adapted to be interchangeable with one or more other sensor modules. A sensor module for use in a fluidic system in one particular embodiment may comprise a sensor, a cap and base enclosing said sensor and electronic circuitry coupled to said sensor, wherein said cap and base are adapted to allow a fluid to flow past at least a portion of said sensor, and the base is attached to said cap, wherein said base has an input port and an output port, each of which are adapted to have fluidic connections thereto, and wherein said base further comprises a first passageway adapted to allow fluid to flow from the input port to the sensor face, and wherein said base has a second passageway adapted to allow fluid flow from the sensor face to an output port, wherein said base is adapted and constructed to be removably attached in an analytical instrument system or to an adapter that is adapted to allow sealing connections to tubing, such as via fluidic fittings. Said adapter may have an input port and an output port, each of which are adapted to have fluidic connections thereto, and said adapter may further comprise a first passageway adapted to allow fluid to flow from its input port to the input port of the sensor module base, and a second passageway arranged to allow fluid to flow from the output port of said module base to the output port of said adapter. The sensor module may include one or more sensors, such as one or more of the following: fluid flow, pressure, temperature, pH, optical, MEMS sensors, humidity, position, motion, or biosensor sensor. The sensor module may further comprise a base and/or a cap and/or an adapter which comprises a biocompatible material, such as polyetheretherketone. In certain embodiments, the base and/or the cap and/or the adapter may comprise either or both of printing or graphics, such as printing or graphics which may identify the input port as an input port, indicate the appropriate direction of flow, identify the sensor included therein, and the like. A portion of the base and/or the cap may be overmolded over a portion of the sensor in some embodiments, and such portion of the sensor may be a perimeter edge, such as an edge of a printed circuit board of such sensor.

In certain embodiments of the present disclosure, a fluidic system may include a first modular sensor comprising a first sensor having electronic circuitry coupled thereto and adapted to sense a first condition and provide an output signal thereof, and having a perimeter, a first cap which may cover at least a portion of said first sensor and may cover some or all of the electronic circuitry coupled to said first sensor, with the cap removably or permanently attached to a base, wherein the base comprises an input port and an output port and provides a fluid passageway between the input port and the output port of said base adapted to allow a fluid to flow therethrough past at least a portion of said first sensor, and an adapter removably or permanently attached to said base, wherein said adapter also has an input port and an output port, each of which are adapted to have tubing removably connected thereto, such as with any conventional fitting assembly, and wherein said adapter further comprises a first passageway adapted to allow fluid to flow from the input port of said adapter to the input port of said base, and a second passageway adapted to allow fluid to flow from the output port of said base to the output port of said adapter, and wherein at least a portion of said base covers at least a portion of said first sensor that is proximal a perimeter portion of said first sensor, and wherein said adapter is adapted to be removably attached in a fluid pathway of a system, and wherein said first modular sensor is designed and built so that it is adapted to be easily replaced with a second modular sensor comprising a second sensor having electronic circuitry coupled thereto and adapted to sense a second condition and provide an output signal thereof, and having a perimeter, and a second cap covering at least a portion of said second sensor and/or the electronic circuitry coupled to said second sensor, wherein said second sensor further comprises a base having an input port and an output port and provides a fluid passageway between the input port and the output port of said second base adapted to allow a fluid to flow therethrough past at least a portion of said second sensor, and a second adapter attached to said second base, wherein said second adapter has an input port and an output port, each of which are adapted to have tubing removably connected thereto, such as with any conventional fitting assembly, and wherein said second adapter further comprises a first passageway adapted to allow fluid to flow from the input port of said second adapter to the input port of said second base, and a second passageway adapted to allow fluid to flow from the output port of said second base to the output port of said second adapter, and wherein at least a portion of said second base encapsulates at least a portion of said second sensor that is proximal a perimeter portion of said second sensor, and wherein said second adapter is adapted to be removably attached in a fluid pathway of a system, and wherein said first modular sensor and said second modular sensor are adapted so that the first modular sensor and second modular sensor can be connected in place of one another in a fluidic system. The first and second sensors may sense the same or different conditions, and may provide output signals indicating such sensed conditions, including conditions and parameters such as flow rate, pH, temperature, pressure, and so forth. The first modular sensor and the second modular sensor may also be adapted to be connected in place of one another in substantially the same location in a fluidic system, such as between the same two components in the fluidic system, and/or may be adapted to be connected in place of one another to the same component in the fluidic system. Preferably, the modular sensor system does not add any dead volume to the fluidic system.

In yet another embodiment of the present disclosure, methods of obtaining information in a fluidic system are provided, with such methods including the steps of providing a first modular sensor, wherein the first modular sensor comprises a first sensor having electronic circuitry coupled thereto and adapted to sense a first condition and provide an output signal corresponding thereto, a first cap covering at least a portion of said first sensor and electronic circuitry coupled to said first sensor, and a first base attached to said first cap, wherein said first base has an input port and an output port, each of which are adapted to be removably connected to a component in a fluidic system, and wherein said first base further comprises a first passageway adapted to allow fluid to flow from the input port of said first base past at least a portion of said first sensor, and then to the output port of said first base, wherein at least a portion of said first base covers at least a portion of said first sensor that is proximal a perimeter portion of said first sensor, and wherein said first base is removably attached in a fluid pathway of the fluidic system, providing a second modular sensor, wherein the second modular sensor comprises a second sensor having electronic circuitry coupled thereto and adapted to sense a second condition and provide an output signal corresponding thereto, and having a perimeter, a second cap covering said second sensor and the electronic circuitry coupled to said second sensor, and a second base attached to said second cap, wherein said second base has an input port and an output port, each of which are adapted to be removably connected to a component in a fluidic system, and wherein said second base further comprises a first passageway adapted to allow fluid to flow from the input port of said second base past at least a portion of said second sensor and then to the output port of said second base, and wherein at least a portion of said second base encapsulates at least a portion of said second sensor that is proximal a perimeter portion of said second sensor, and wherein said second base is adapted to be removably attached in the fluid pathway of the fluidic system, disconnecting said first modular sensor from the fluid pathway of the fluidic system, and connecting said second modular sensor to the fluid pathway of the fluidic system. In such methods, the first condition and the second condition may be the same or may be different, and the first condition and/or the second condition may comprise any one or more of the following: flow rate, pH, temperature, pressure, humidity, one or more bubbles, or conductivity. In some methods, the second modular sensor is connected to the fluid pathway of the fluidic system in place of said first modular sensor, while in other methods, the second modular sensor is connected to a second location in the fluid pathway of the fluidic system which is different than the location of the first modular sensor before being disconnected from the fluidic system. The methods also include the further steps in the alternative of then connecting the first modular sensor to a second, different location in the fluidic pathway in the fluidic system, or to a location in a fluidic pathway in a second fluidic system. The methods also may comprise the additional steps of obtaining a signal from said first modular sensor and transmitting the signal to and storing the signal in a computer readable memory, and obtaining a signal from said second modular sensor and transmitting the same to and storing the same in a computer readable memory. The methods also may include the further and additional steps of providing an adapter, removably attaching said adapter to the base of either the first or the second modular sensor before connecting either the first or second modular sensor to the fluidic pathway of the fluidic system. Moreover, the connection of the second modular sensor may be made with the same tubing and/or components as those which were used to connect the first modular sensor to the system.

BRIEF DESCRIPTION OF THE FIGURES

FIG. 18A provides a top view of a base of a modular sensor in accordance with an embodiment of the present disclosure.

FIG. 18B provides a cross-sectional view of the base taken along line 18B-18B of FIG. 18A.

FIG. 18C provides a bottom view of the base of FIG. 18A.

FIG. 18D provides a cross-sectional view of the base of FIG. 18A taken along line 18D-18D of FIG. 18A.

FIG. 18E is a cross-sectional view of the base taken along line 18E-18E of FIG. 18A.

FIG. 20 is a cross-sectional view of an alternative embodiment of a modular sensor system in accordance with the present disclosure.

DETAILED DESCRIPTION

Figure 1:
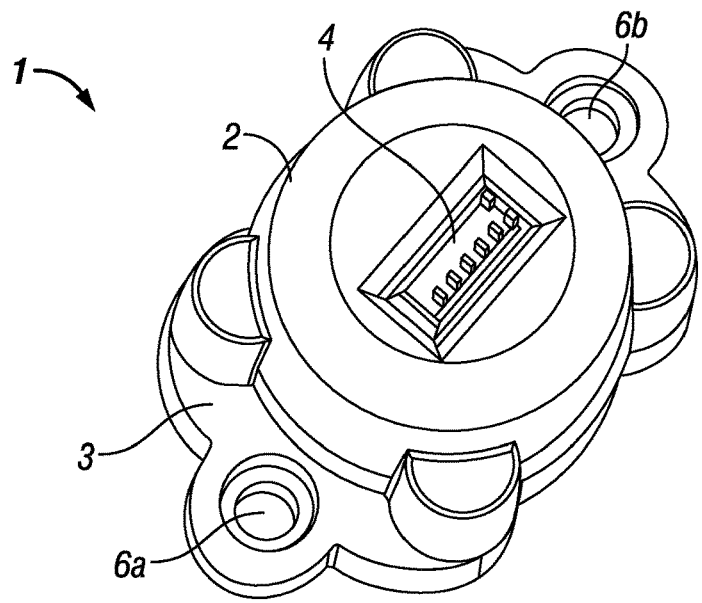
FIG. 1 is an isometric view of an embodiment from above a modular sensor system in accordance with the present disclosure.
Figure 2:
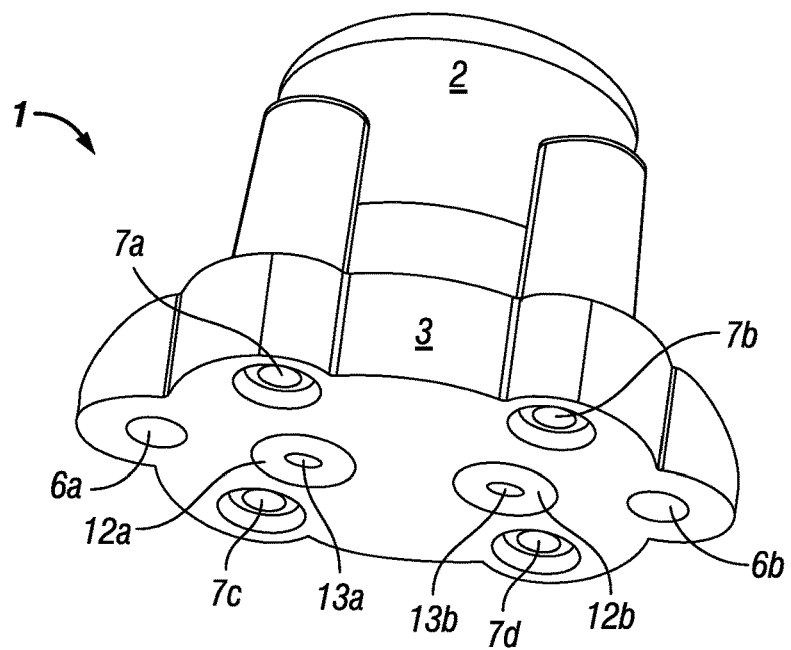
FIG. 2 is an isometric view of an embodiment from below of a modular sensor system in accordance with the present disclosure.

In FIGS. 1 and 2, a modular sensor system 1 is shown. Modular sensor system 1 includes a cap 2 and a base 3. As shown in FIG. 1, the base 3 includes holes 6a and 6b, each of which are located on opposing ends of the sensor 1 and are adapted to receive and hold therein a screw or other fastening means to thereby allow the modular sensor system 1 to be removably attached to either an adapter or another member (not shown in FIGS. 1 and 2) or a component in a fluidic system or instrument, such as a manifold. As noted above, sensors can find useful application in a wide variety of fluidic-based analysis and biological assay systems and instruments, including for example analytical instrument ("AI") systems. For purposes of brevity, this disclose uses AI systems as the primary example of a system in which the modular sensor system 1 can be used, but such use is merely for purposes of illustration only and those skilled in the art will readily appreciate the wide variety of instruments and systems in which the modular sensor system 1 can be used in light of the detailed description herein. As shown in FIG. 2, the base 3 is securely (but in this case removably) attached to the cap 2 by a series of screws 7a, 7b, 7c, and 7d. (As detailed below, the cap 2 and base 3 may be permanently attached as well, and in other embodiments the cap 2 and base 3 may be attached in other ways, such as by glue, adhesive, ultrasonic welding, or a press-fit configuration, and the like. In another embodiment, the cap 2 and base 3 can each have threaded portions which are adapted to engage with one another to removably secure the cap 2 and base 3 together.) As shown in FIGS. 1 and 2, the screws are inserted and located in holes in the base 3 which are adapted to correspond to holes (not shown in FIGS. 1 and 2) in the cap 2 that in turn are adapted to receive the screws 7a, 7b, 7c, and 7d. As shown in FIG. 1, a substantially rectangular area 4 is located on the top face of the cap 2. The area 4 includes leads or connectors which can be attached to a computer or other processing means, and can provide signals from the sensor (not shown) located within the cap 2 of the sensor 1. In addition, in FIG. 2, two o-ring seals 12a and 12b are shown, as are the input port 13a and the output port 13b.

Figure 3:
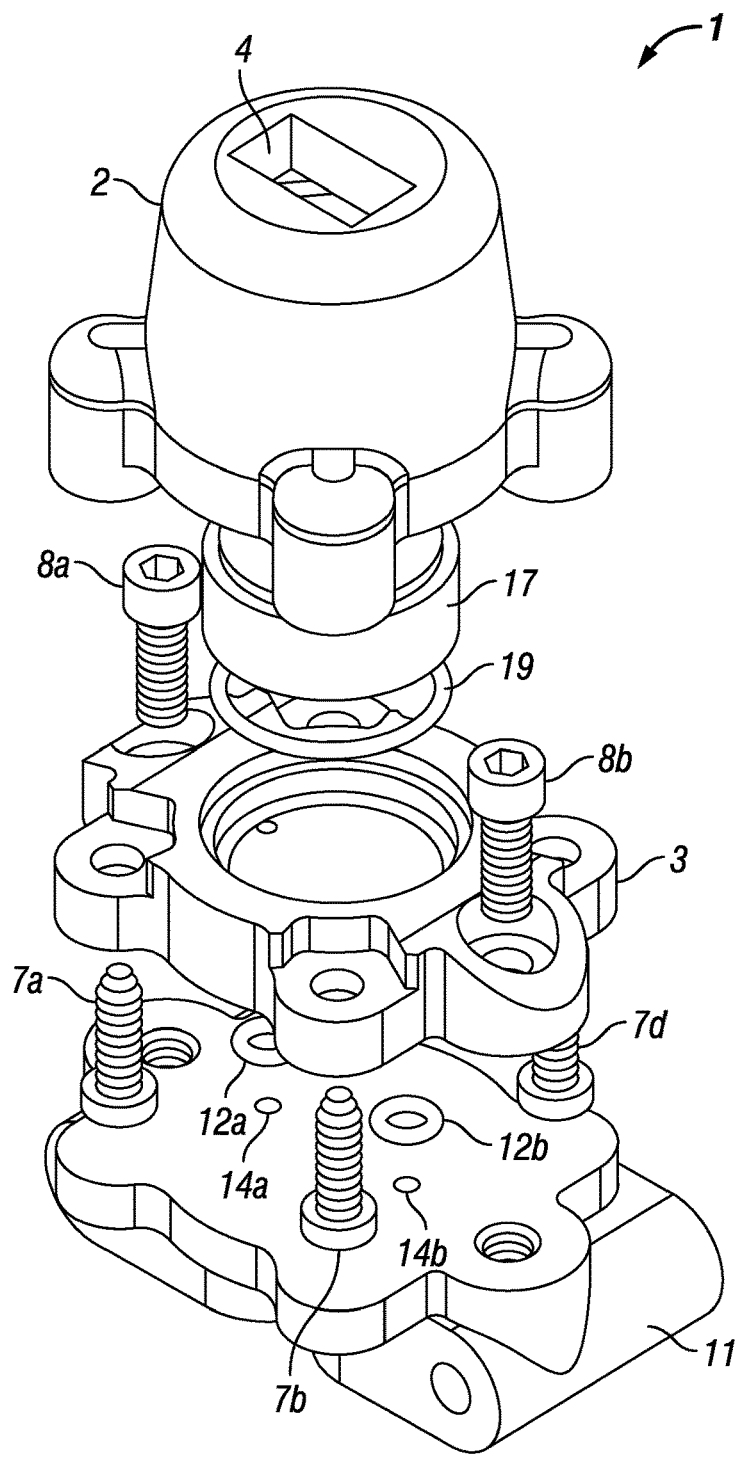
FIG. 3 is an exploded isometric view of a modular sensor having an adapter in accordance with the present disclosure.

Referring now to FIG. 3, an exploded view of the sensor 1 is provided. In FIGS. 1-3 and throughout this disclosure, like items and features shown in various figures will have like numbers for the convenience of the reader. As shown in FIG. 3, the sensor 1 includes the cap 2 and the base 3. As shown in FIG. 3, two screws 8a and 8b are provided and are adapted to fit in holes 6a and 6b of the base 3 to removably attach the base 3 to an adapter 11. Screws 7a, 7b, and 7d are shown and, as noted above, are adapted to fit into holes 5a, 5b, and 5d of the base 3 to removably attach the base 3 to the cap 2. (Although not shown in FIG. 3, a corresponding screw 7c is provided and is adapted to fit securely and removably in hole 5c.) As also shown in FIG. 3, two o-ring seals 12a and 12b are provided. As noted above with respect to FIG. 2, seal 12a corresponds to an input port 13a of the base 3 and seal 12b corresponds to an output port 13b of the base 3. As shown in FIG. 3, the adapter 11 has ports 14a and 14b therethrough, with ports 14a and 14b aligned with and adapted to cooperate with the ports 13a and 13b of the base 3 (ports 13a and 13b are not shown in FIG. 3). The o-ring seals 12a and 12b help seal the connection of the flow path between the ports 14a and 13a and between the ports 14b and 13b. As shown in FIG. 3, the rectangular area 4 at the top of the cap 2 includes a recessed portion, which can be adapted to receive wires or a plug connection to electrically couple the sensor insert 17, of modular sensor system 1 to additional circuitry, such as a computer, other processing means, or the like. At least a portion of insert 17 fits within cap 2, while a bottom end of the insert 17 can fit within a seating recess in the base 3 with additional seat member 19.

Those skilled in the art will appreciate that the cap 2, base 3, and adapter 11, as well as other components of the sensor 1, can be made of a variety of materials, such as rigid or hard polymers. For example, cap 2 can be made of and comprise polyetheretherketone ("PEEK"), acrylonitrile butadiene styrene (ABS) or a polycarbonate (PC), or similar materials. Similarly, base 3 can be made of PEEK, and adapter 11 can also be made of PEEK. Screws 7a-7d and 8a-8b can be made of metal and can be any sort of ordinary screw, or can be made of stainless steel. For biocompatible applications, PEEK can be usefully used for the base 3, the cap 2 and the adapter 11, to thereby ensure that the entire flow path of the fluid comprises a biocompatible material. In addition, o-ring seals 12a and 12b can be made of any number of materials which are biocompatible and compressible and will help maintain a sealing engagement. Examples of appropriate materials for the o-ring seals 12a and 12b include fluoroelastomers and synthetic rubber and a fluoropolymer elastomer combination (such as VITON, for example). Although the use of screws 7a-7d and 8a-8b is shown and described, those skilled in the art will understand that the base 3 and cap 2 can be secured or attached to one another by other means, such as by glue, an epoxy or plastic, adhesives, and the like, if so desired.

It will be appreciated by those skilled in the art that the use of stainless steel components (for example) in an AI system has potential drawbacks in situations involving biological samples, and cannot be routinely used for various applications, such as ion chromatography. For example, the components in a sample in such an application may attach themselves to the wall of stainless steel tubing. This presents problems because a detector's measurements (and thus the output) of a given sample may not accurately reflect the sample if some of the sample's components or ions remain in the tubing and do not pass the detector. Perhaps of even greater concern, however, is the fact that ions from the stainless steel tubing may detach from the tubing and flow past the detector, thus leading to potentially erroneous results. Hence, "biocompatible" or "metal-free" connections and components may be important and may be achieved through the use of a material that is chemically inert with respect to such "biological" samples and the fluid(s) used with such samples, so that ions will not be released by the tubing and thus contaminate the sample.

It will also be appreciated by those skilled in the art that the sensor included in the modular sensor system 1 can be any one or more of various types of sensors, such as a conventional flow sensor, a pressure sensor, a temperature sensor, a pH sensor, and/or photosensors or other optical sensors, MEMs (micro-electro-mechanical systems) sensors, biosensors, humidity sensors, position sensors, bubble sensors, motion sensors, and the like. An example of a commercially available sensor that may be used with sensor 1 is the liquid flow sensor which is commercially available from Sensirion AG of Staefa, Switzerland, and which provides a flow sensor with a flow channel in a planar substrate. This sensor allows for biocompatible operations. An example of such a sensor is disclosed in U.S. Pat. No. 7,905,140, issued on Mar. 15, 2011, to Kanne, and titled "Device with Flow Sensor for Handling Fluids," which is hereby incorporated by reference as if fully set forth herein. Such a sensor typically comes as a glass chip or steel cylinder which requires the use of additional packaging and assembly and/or connection to a manifold before it can be used in a fluidic handling application. Those skilled in the art will appreciate that any one of a number of commercially available sensors may be used as part of modular sensor system 1. Those skilled in the art will further understand and appreciate that sensors such as these typically involve a planar chip which includes a flow path and leads or contacts for the sensor, as well as a membrane or diaphragm to separate the sensor from the flow path and the fluid therein.

The cap 2 of the modular sensor system 1 can be made to incorporate one or more conventional sensors therein. For example, the cap 2 can be overmolded around some or all of the outside edges of the sensor. Typically, a conventional sensor will include electronic circuitry when received from a manufacturer, such as by being incorporated into a printed circuit board (PCB), or placed on a substrate to which electronic circuitry or a PCB is coupled. For such sensors, a perimeter exists around the edge of the substrate or PCB, and the cap 2 can be overmolded to encapsulate all or some of the perimeter edges of the sensor substrate or PCB. Overmolding the cap 2 around the sensor has the advantages of protecting the sensor (which can often be sensitive and easily broken) from contacts with human skin or other objects which may harm or contaminate the sensor, and also protect the sensor against breaking, such as if dropped or roughly handled. In addition, it is often desirable to keep the sensor and its associated PCB and/or electronics shielded from water, such as by having it located in a watertight or fluidtight location (or water-resistant or fluid-resistant). Alternatively, if it is desired to have the sensor located in the base 3, then the base 3 can be overmolded around the sensor instead of cap 2. Those skilled in the art will appreciate that the sensor can be encapsulated in whole or in part in either base 3 or cap 2, and can be encapsulated by means other than overmolding, such as through the use of a potting compound, silicone, dunking the sensor in a protective material, and 3D printing a base 3 or cap 2 over and around the sensor, as may be desired.

It will also be appreciated that the cap 2 as shown in FIGS. 1-3 is generally cylindrical and/or frusto-conical in shape. This shape generally allows the sensor 1 to have a smaller footprint (i.e., area or volume) required for its location and installation in a system, thus making it easier for an operator or user to quickly install and/or connect, or disconnect and/or remove, the sensor 1. The shape and size of the cap 2 may be driven somewhat by the shape and size of the sensor to be included therein, and/or by the intended use of the modular sensor in a given application, but those skilled in the art will appreciate that the cap 2 (and base 3) can be designed and adapted such that a given modular sensor system 1, which may have a first type of sensor therein of a first shape and/or size, may have the same shape and size as a second modular sensor system 1, even though the first and second modular sensors have different types of sensors therein or have sensors therein which have different shapes and/or sizes. Alternatively, a first modular sensor 1 and a second modular sensor 1 may have different sizes and/or shapes, such as may be the case to accommodate sensors of different sizes and/or shapes, or simply to quickly and visually indicate to an operator that they contain different sensors from one another. Moreover, the first modular sensor 1 and a second modular sensor 1 may have different shapes or sizes, but may nonetheless have the same shaped and sized ports for connecting to a fluidics system, thus allowing the easier interchange of the modular sensors with one another. Although not shown in FIGS. 1-3, it will be appreciated that the cap 2 can have the sensor either permanently or removably attached thereto. In one embodiment, the cap 2 can be made (such as by molding) to have internal ribs and projections on an inner surface of the cap 2 so that when the cap 2 is pressed downwardly on the base 3 (or the base 3 and cap 2 are pressed together, as the case may be), the internal ribs and projections push the sensor and/or its associated PCB and electronics into position with respect to the base 3, such as to ensure that the sensor and its associated electronics are electrically coupled to one or more leads, contacts, or other electrical connections so as to electrically couple the sensor and its associated electronics to one or more leads or output connectors or connections to provide an output signal from the sensor.

Figure 4:
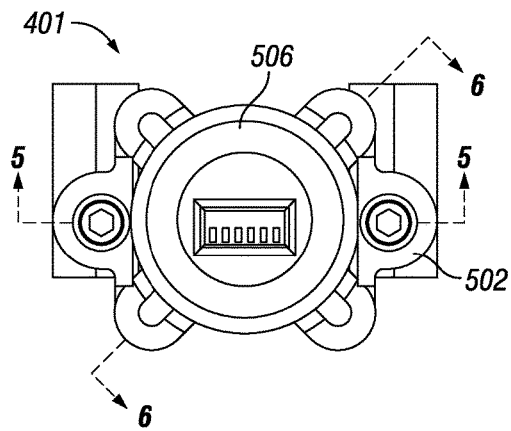
FIG. 4 is a top view of a modular sensor system having an adapter in accordance with the present disclosure.
Figure 5:
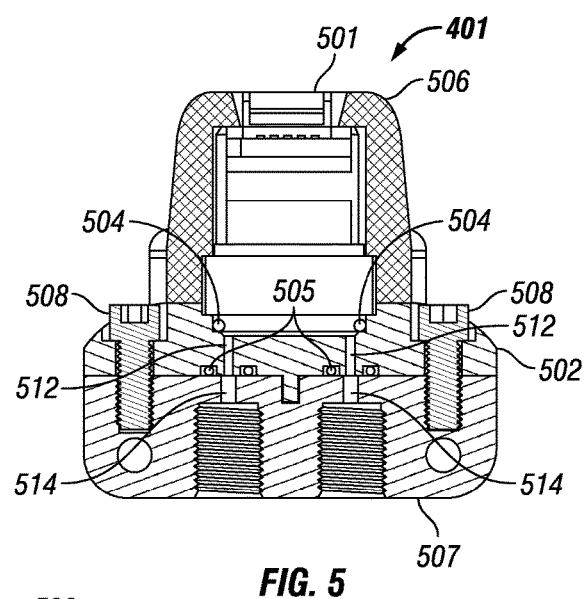
FIG. 5 is a cross sectional view of the modular sensor system and adapter of FIG. 4.
Figure 6:
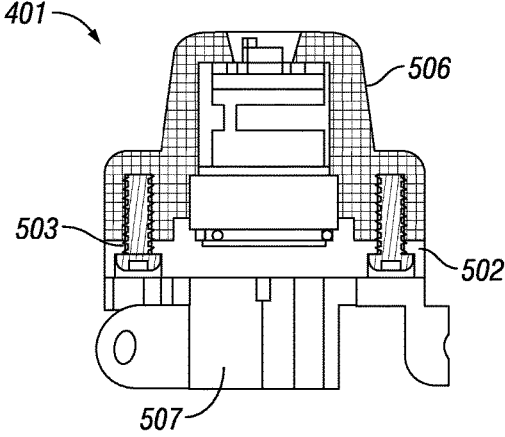
FIG. 6 is another cross sectional view of the modular sensor system and adapter of FIG. 4.

Referring now to FIGS. 4-6, an assembled version of the modular sensor 1 is shown. In FIG. 4, a top view of the sensor 1 is provided, while in FIGS. 5 and 6, cross sectional views along lines 5-5 and 6-6 of FIG. 4, respectively, are provided.

FIG. 4 provides a top view of a modular sensor system 401, which includes an absolute pressure sensor (although those skilled in the art will appreciate that other types of sensors can be used instead of the pressure sensor). FIG. 5 provides a cross-sectional view of the modular sensor system 401 taken along line 5-5 of FIG. 4. As can be seen best in FIG. 5, the modular sensor system 401 includes a sensor base 502, a sensor cap 506, two o-ring seals 505, an o-ring seal 504, an adapter 507, and screws 508. In FIG. 6, a cross-sectional view of the modular sensor system 401 taken along line 6-6 of FIG. 4 better shows screws 503, which can be used to removably attach the base 507 and cap 506 together. The screws 508 can be used to removably attach the base 502 to the adapter 507. As shown in FIG. 5, the adapter 507 and base 502 both have two input ports and corresponding passageways 512, 514 which align with one another when adapter 507 and base 502 are attached. The o-rings 505 are located so as to seal the connection of the passageways of the adapter 507 with the ports of the base 502. Located within the cap 506 is a pressure sensor 501, which includes associated circuitry and electronics so that sensor 501 is adapted to sense pressure of a fluid flowing through modular sensor system 401 and provide an output signal corresponding to such pressure.

Figure 7:
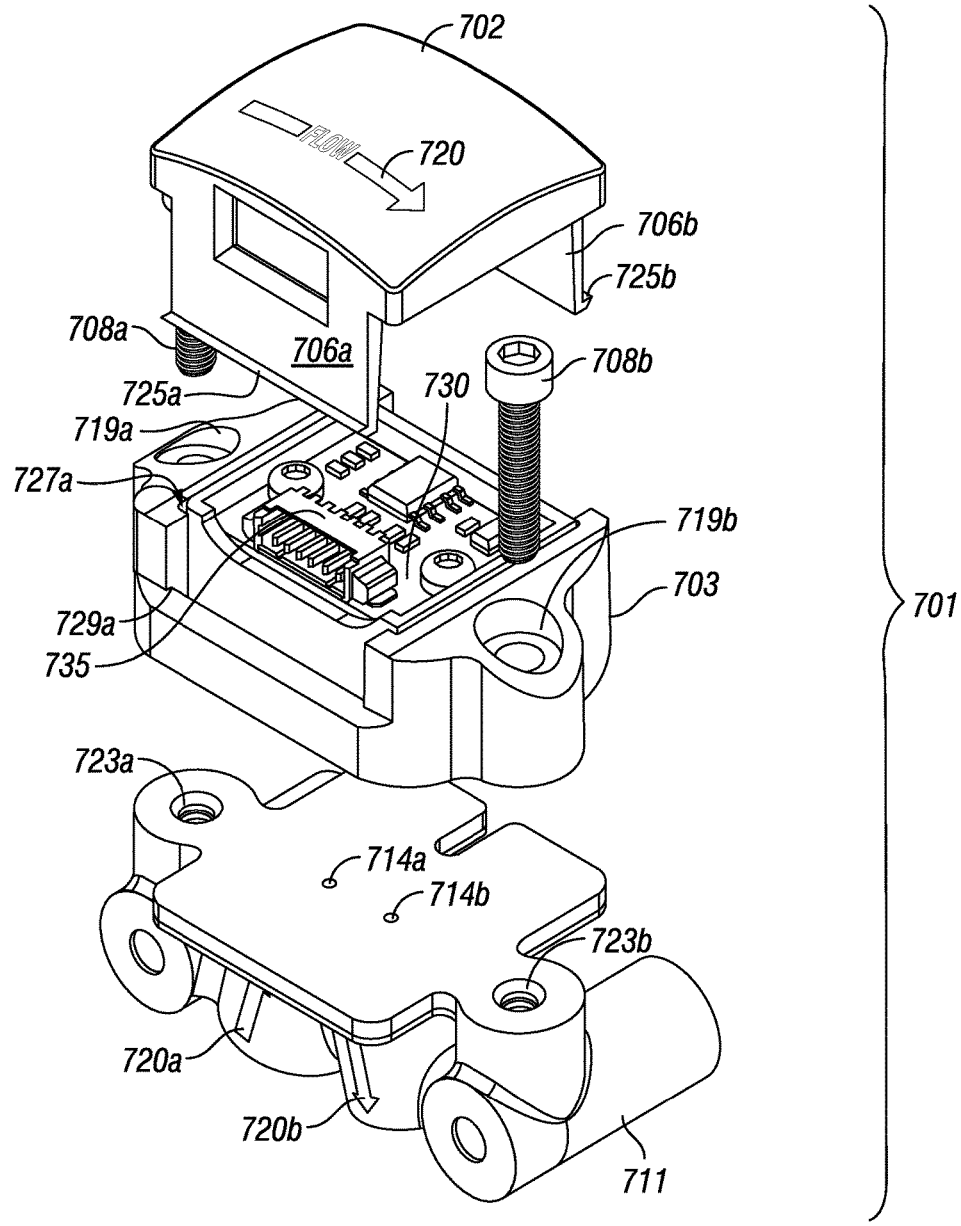
FIG. 7 is an exploded view of an alternative embodiment of a modular sensor system, including an adapter, in accordance with the present disclosure.

Referring now to FIG. 7, an alternative embodiment of a modular sensor system 701 is shown. In FIG. 7, a modular flow sensor 701 is shown in an exploded view. Sensor 701 includes a cap 702, a first base 703, and an optional adapter 711. As shown in FIG. 7, the top of the cap 702 includes printing and graphics 720 to provide a visual indicator to an operator of the proper direction of fluid flow through the modular sensor system 701. Such printing and/or graphics 720 allows an operator to quickly determine whether the modular sensor system 701, if connected, is connected with the right orientation or not, and, if the sensor 701 is not installed, determine the proper orientation for the sensor 701 before installing and connecting the sensor 701 in a system. As also shown in FIG. 7, the adapter 711 includes additional printing and/or graphics 720a and 720b to indicate the proper direction of fluid flow through the modular sensor system 701. Although the printing and graphics indicated in 720, 720a and 720b show the proper direction of fluid flow through the sensor 701, those skilled in the art will appreciate that the printing and/or graphics 720, 720a, and 720b may indicate additional or different information regarding the sensor 701 and/or its intended use, such as any one or more of the following as examples: pressure rating, flow specifications, orifice specifications, voltage in/out signals, sealing or other material(s) used in the sensor, mounting torque, part number, revision or version number, serial number, sensor type, sensor capacity, fluid or media compatibility, and the like. It will also be appreciated that the printing and/or graphics 720, 720a, and 720b can be printed onto the cap 702 and/or adapter 711, and/or can be molded into the cap 702 and/or base 703, as may be desired.

As also shown in FIG. 7, a printed circuit board ("PCB") 730 is included as a part of the base 703. PCB 730 includes various electronic components and circuitry, such as one or more memory chips or devices, one or more processors, and various circuitry to connect the sensor and analyze the results obtained from the sensor and provide output signals corresponding thereto. As shown in FIG. 7, the PCB 730 also includes a portion 735 which has several connectors or leads adapted to receive a plug connector to electrically couple the PCB 730 to other equipment, such as a computer, one or more other processors, and/or other devices or systems. Those skilled in the art will appreciate that the PCB 730 can be of a type provided with a commercially available and conventional sensor, or can be a modified or a customized PCB with additional or different features, as may be desired.

The base 703 of the modular sensor system 701 can be adapted or made so as to incorporate one or more conventional sensors therein. For example, the base 703 can be overmolded around some or all of the outside edges of the sensor. Overmolding the base 703 around the sensor has the advantages of protecting the sensor (which can often be sensitive and easily broken) from contacts with human skin or other objects which may harm or contaminate the sensor, and also protect the sensor against breaking, such as if dropped or roughly handled. Alternatively, if it is desired to have the sensor located in the cap 702, then the cap 702 can be overmolded around the sensor instead of base 703. When assembled with base 703, the cap 702 will protect the PCB from damage and contamination, such from sources as noted above.

As also shown in FIG. 7, screws 708a and 708b are provided, and can be inserted into and through holes 719a and 719b, respectively, in base 703, and holes 723a and 723b in adapter 711, and screwed into holes 723a and 723b in this embodiment to removably and securely attach base 703 and adapter 711 together. As can be seen in FIG. 7, adapter 711 includes openings 714a and 714b to allow fluid to flow between adapter 711 and ports in base 703 (not shown in FIG. 7).

Still referring to FIG. 7, a ridge or edge 725a and a corresponding ridge or edge 725b are shown on opposing sides of the cap 702. These ridges 725a and 725b extend outwardly from the longitudinal axis of the cap 702. The base 703 is configured to include a slot or groove 727a on a first side (and a second corresponding slot or groove 727b, which is not shown in FIG. 7, on the second side of base 703), with the grooves 727a and 727b adapted to hold a portion of the sides 706a and 706b, respectively, of the cap 702 when cap 702 is assembled with base 703. The sides 706a and 706b are adapted to be flexible and can move inwardly when pushed or pressed by an operator, and are adapted in size and shape to readily fit into the grooves 727a and 727b, respectively. Ridges 725a and 725b can slide through the grooves 727a and 727b, respectively, when sides 706a and 706b are pressed inwardly and, when the ridges 725a and 725b extend past the lower edges 729a and 729b (not shown in FIG. 7), respectively of base 703, the operator can release the pressure on sides 706a and 706b, allowing them to move outwardly, thus providing a snap-fit or press-fit by which edges 725a and 725b engage with edges 729a and 729b, respectively, to hold the cap 702 removably attached to the base 703.

Figure 8:
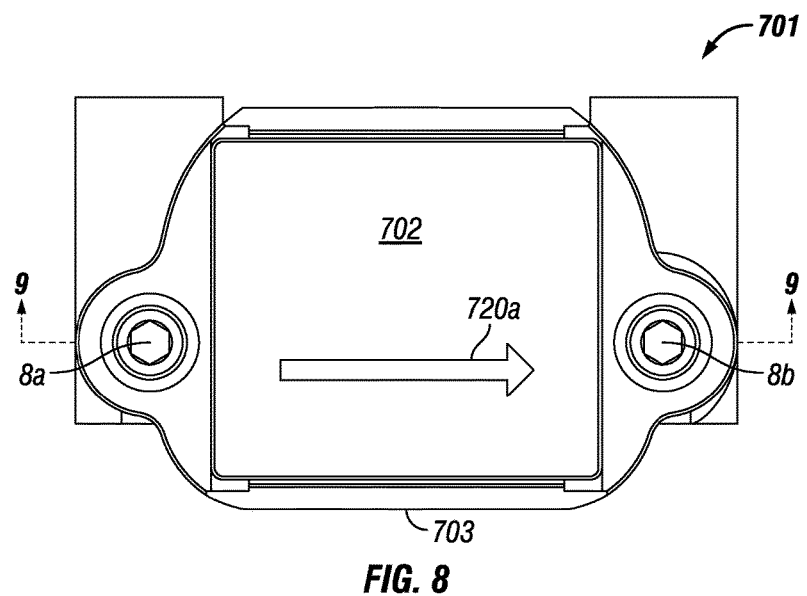
FIG. 8 is a top view of the alternative embodiment of modular sensor system and adapter of FIG. 7.
Figure 9:
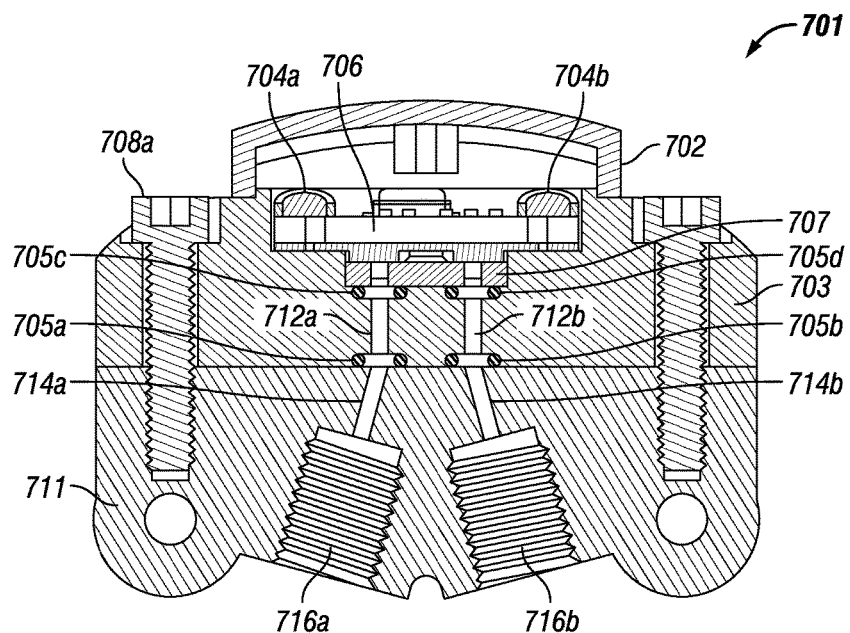
FIG. 9 is a cross sectional view of the modular sensor system and adapter of FIG. 7 taken along line 9-9 of FIG. 8.

In FIG. 8, a top view of the modular sensor system 701 is shown as assembled. Like features and items will have the same numbers in FIGS. 7-9 for the convenience of the reader. FIG. 9 is a cross sectional view of the modular sensor system 701 taken along line 9-9 of FIG. 8.

As shown in FIG. 9, an adapter 711 is included and is removably attached to base 703 by screws 8a and 8b. The adapter 711 includes internally threaded ports 716a and 716b, each of which is adapted to receive a fitting assembly (such as tubing, a ferrule, and a nut in a conventional fitting assembly arrangement) which can be removably secured to each of ports 716a and 716b by rotating a nut relative to the port to obtain a sealing engagement (not shown in FIG. 9). The ports 716a and 716b are each in fluid communication with a passageway (i.e., one of 714a and 714b, respectively), which in turn are in fluid communication with corresponding passageways 712a and 712b in base 713. Those skilled in the art will appreciate that this arrangement with adapter 711 allows for the base 703 and cap 702 to be used with adapter 711, which in turn may provide a variety of shapes and sizes of ports 716a and 716b, such that an operator can connect the modular sensor system 701 between any two components or essentially anywhere in the fluid flowpath of an AI instrument, and without the need for a manifold or other port of a component. Those skilled in the art will appreciate and understand that the ports 716a and 716b need not have threading, need not be internal, and may be flat-bottomed or have a cone-shaped bottom, and thus may be adapted for use with a variety of fittings and/or components.

As shown in FIG. 9, the modular sensor 701 includes thread forming screws 704a and 704b, which are adapted to securely hold the PCB 706 in place. The PCB 706 may contain various electronic circuitry coupled to the sensor 707, which fits in a recess or cavity of base 703 which is adapted to receive and snugly hold the sensor 707. Alternatively, the base 703 can be overmolded around some or all of the perimeter of sensor 707 to thereby encapsulate the sensor 707 in whole or in part. Also as shown in FIG. 9, there are o-ring seals 705a, 705b, 705c, and 705d, which are located and adapted to provide a seal where the adapter 711 and base 703 meet and where the base 703 and cap 702 meet, so that the fluid pathway formed by the passageways in adapter 711, base 703, and cap 702 are sealed and do not leak when a fluid flows therethrough.

Figure 10:
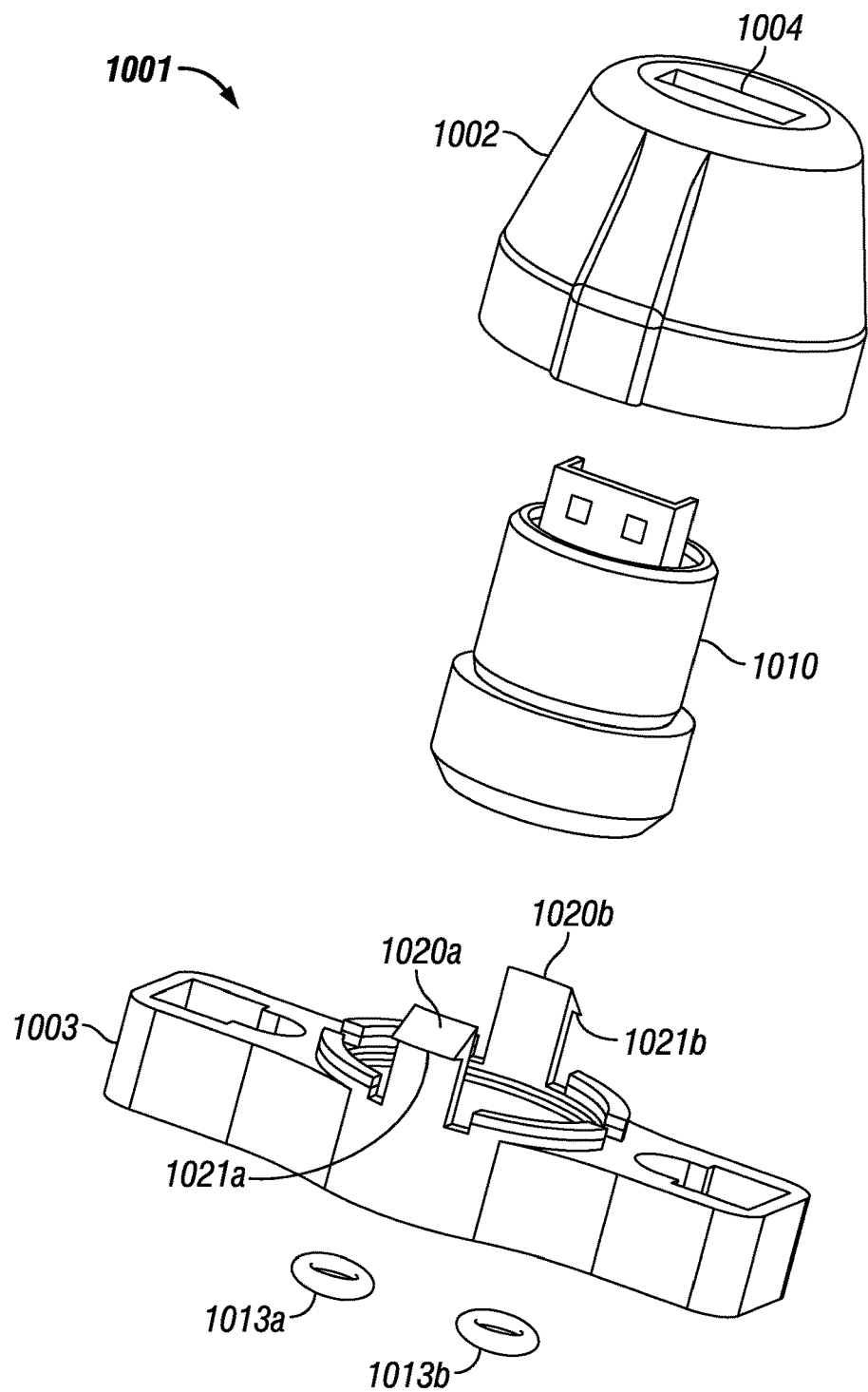
FIG. 10 is an exploded view of a modular sensor system in accordance with an alternative embodiment of the present disclosure.
Figure 11:
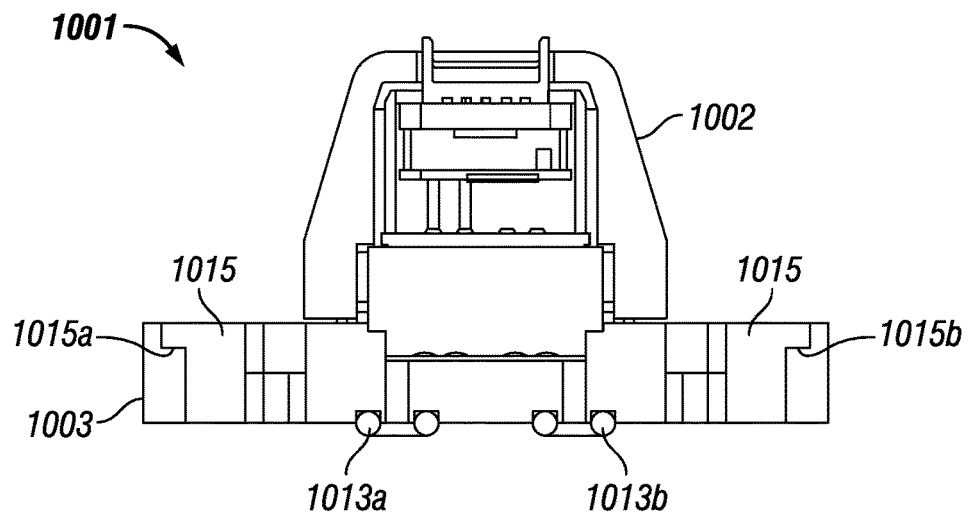
FIG. 11 is a side cross sectional view of the modular sensor system of FIG. 10.
Figure 12:
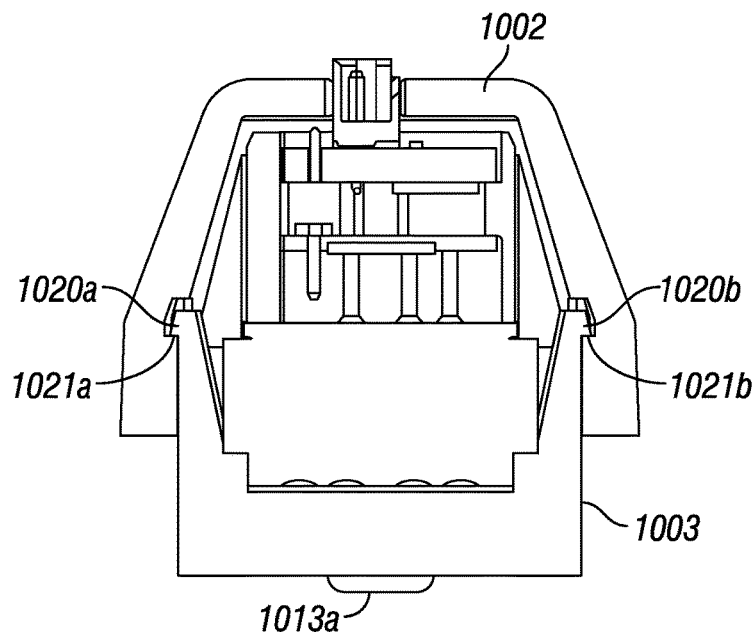
FIG. 12 is an end cross sectional view of the modular sensor system of FIGS. 10 and 11.

Referring now to FIGS. 10-12, another alternative embodiment of a modular sensor system 1001 is shown. In FIG. 10, modular sensor system 1001 is shown in an exploded view. Modular sensor system 1001 has a cap 1002 which is generally and substantially frusto-conical in shape and has an opening 1004 at a top end. At least a portion of insert 1010 fits within cap 1002, while a bottom end of the insert 1010 can fit within a seating recess in base 1003. The base 1003 is substantially rectangular in shape, although it can have a widened middle portion as shown in FIG. 10. O-rings 1013a and 1013b are adapted to fit around ports in the bottom face of the base 1003 (not shown in FIG. 10). As also shown in FIG. 10, the base 1003 has two projecting portions 1020a and 1020b on opposing sides of the recess in the middle portion of the base 1003. Each of projecting portions 1020a and 1020b has ends with ridges 1021a and 1021b, respectively, which can be used to removably attach the base 1003 and cap 1002 together by a snap-fit. An operator can press the portions 1020a and 1020b towards the longitudinal axis of the base 1003, place the cap 1002 over them, and then release the pressure on portions 1020a and 1020b, which will then expand outwardly and will secure the base 1003 and cap 1002 together, such as by the engagement of the ridges 1021a and 1021b with shoulder portions formed as part of the cap 1002, such as is shown in FIG. 12.

In FIG. 11, a cross sectional side view of the sensor 1001 is provided. Like items and features have the same numbers in FIGS. 10-12 for the convenience of the reader. In FIG. 11, the base 1003 and cap 1002 are attached. As shown in FIG. 11, the base 1003 has two holes 1015 extending therethrough at opposing ends of base 1003. Each of holes 1015 has at a top end a shoulder portion 1015a and 1015b, respectively.

Figure 13:
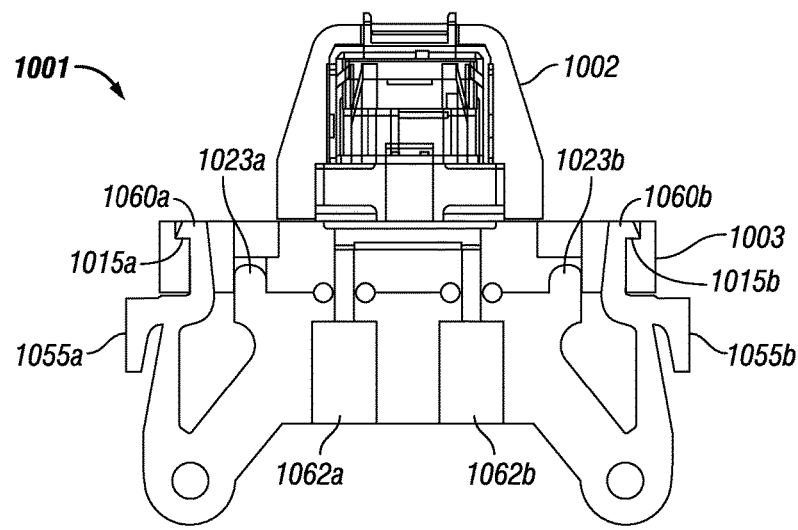
FIG. 13 is a side cross sectional view of an alternative embodiment of a modular sensor system and adapter in accordance with the present disclosure.

Now referring to FIG. 13, a cross sectional end view of the sensor 1001 in an alternative embodiment is provided. Like items and features in FIG. 13 have the same numbers as in FIGS. 10-12 for the convenience of the reader. As shown in FIG. 13, the base 1003 and cap 1002 are attached. In addition, an adapter 1050 is shown as removably attached to base 1003. The adapter 1050 includes two ports 1062a and 1062b, which are adapted to serve as an input port and an output port for the sensor 1001. Ports 1062a and 1062b can have internal threaded portions adapted to engage with a fitting assembly having an externally threaded nut or the like, or can be adapted to engage with any other type of fitting assembly. In addition, the adapter 1050 has passageways adapted to allow fluid communication between the ports 1062a and 1062b and passageways in the base 1003. The adapter 1050 also includes projecting portions 1023a and 1023b, which are adapted to fit in receiving recessed portions in the bottom face of the base 1003. Adapter 1050 also includes arms 1060a and 1060b which extend through the holes 1015 on opposing sides of the base 1003. As shown in FIG. 13, each of arms 1060a and 1060b has a top portion with an outer dimension greater than that of the arm below the top portion and resting within hole 1015. The top portions of arms 1060a and 1060b are adapted so that each extends over the shoulders 1015a and 1015b of the holes 1015 and thus removably holds the adapter 1050 and base 1003 together. Those skilled in the art will appreciate that the adapter 1050 and arms 1060a and 1060b can be made of a material, such as polyetheretherketone (PEEK) or other polymers such as polyphenylene sulfide (PPS), polyetherimide (PEI), polyphenylsulfone (such as RADEL), polymethylmethylacrylate (PMMA), polycarbonates, polysulfone, and the like, so that the adapter 1050 is sufficiently strong yet flexible so that an operator can squeeze or press the arms 1060a and 1060b towards the center of the base 1003 and adapter 1050 when attached so that the top portions of arms 1060a and 1060b are not engaged with shoulders 1015a and 1015b, respectively, and the arms 1060a and 1060b can be easily and quickly removed from holes 1015 by the operator to separate the adapter 1050 from the base 1003. Alternatively, an operator can press the arms 1060a and 1060b together towards the center of the adapter 1050, insert them into the holes 1015, and then release the pressure on arms 1060a and 1060b so that the top portions move outwardly and engage with the shoulders 1015a and 1015b, respectively, to hold the adapter 1050 and base 1003 together. This configuration allows an operator to easily attach or remove an adapter 1050 from a sensor 1001, such as when the operator wishes to use alternative ports 1062a and 1062b of different sizes or shapes for different fitting assemblies or the like, or when the adapter 1050 is no longer needed, such as if the sensor 1001 is to be secured to a manifold for a particular application. This snap-fit or press-fit configuration by which adapter 1050 and base 1003 are adapted to the quickly and removably attached from another will allow for faster and easier connection and disconnection of the modular sensor system 1001 in a fluidics system.

Figure 14A:
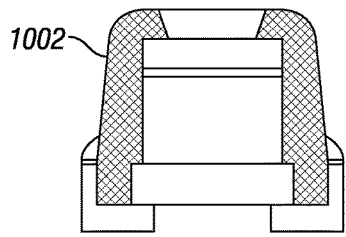
FIG. 14A provides a cross-sectional view taken along line 14A-14A of FIG. 14B of a cap of a modular sensor in accordance with an embodiment of the present disclosure.
Figure 14B:
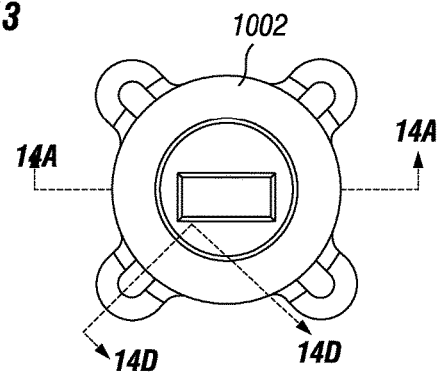
FIG. 14B provides a top view of a cap of a modular sensor of FIG. 14A.
Figure 14C:
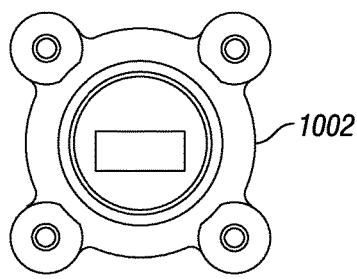
FIG. 14C provides a bottom view of the cap of FIG. 14B.
Figure 14D:
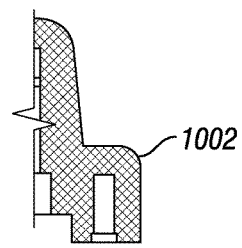
FIG. 14D provides a cross-sectional view taken along line 14D-14D of FIG. 14B.

Referring now to FIGS. 14A-14D, 15A 15D, 16A 16C, 17A-17D, 18A-18E, 19A-19D, and 20, additional features and details regarding the modular sensor of the present disclosure will be readily apparent. FIGS. 14A-14D provide additional views regarding a cap of a modular sensor, such as cap 2 as shown in FIG. 1, for example. FIG. 14B provides a top view of the cap, FIG. 14A provides a cross-sectional view taken along line 14A-14A of FIG. 14B. FIG. 14C provides a bottom view of the cap 2, while FIG. 14D provides a cross-sectional view taken along line 14D-14D of FIG. 14B.

Figure 15C:
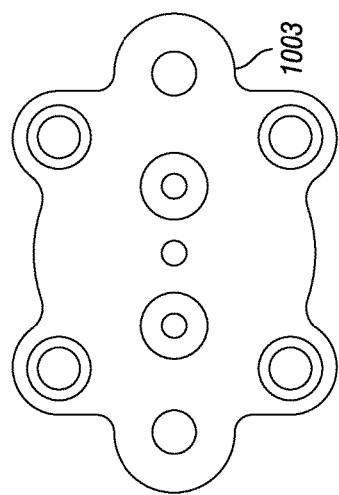
FIG. 15C provides a bottom view of the base of FIG. 15B.
Figure 15D:
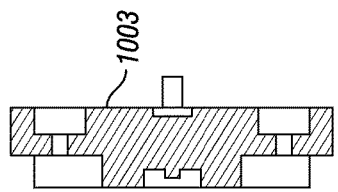
FIG. 15D provides a cross-sectional view of the base taken along line 15D-15D of FIG. 15B.
Figure 15A:
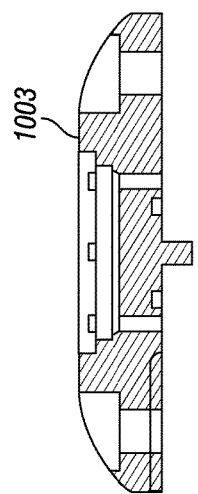
FIG. 15A is a cross-sectional view of the base of a modular sensor in accordance with the present disclosure taken along line 15A-15A of FIG. 15B.
Figure 15B:
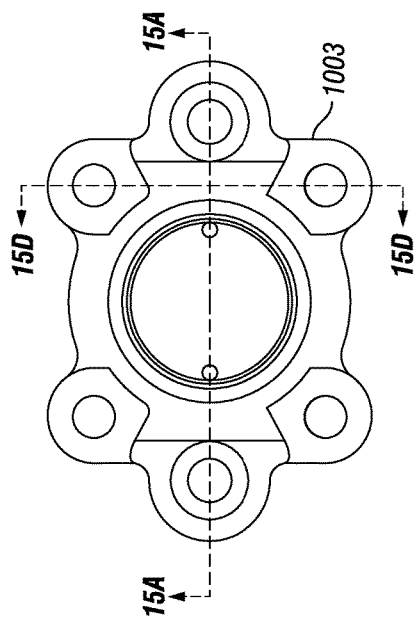
FIG. 15B provides a top view of the base of FIG. 15A.

FIGS. 15A-15D provide additional views and details regarding a base of a modular sensor, such as base 3 as shown in FIG. 1, for example. FIG. 15A is a cross-sectional view of the base of the modular sensor taken along line 15A-15A of FIG. 15B. FIG. 15B provides a top view of the base, while FIG. 15C provides a bottom view of the base. FIG. 15D provides a cross-sectional view of the base taken along line 15D-15D of FIG. 15B.

Figure 16A:
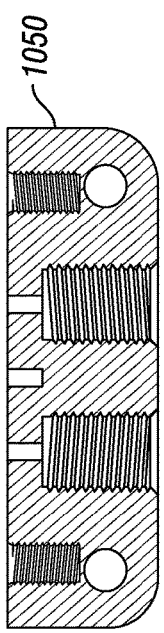
FIG. 16A provides a cross-sectional view of an adapter of a modular sensor in accordance with the present disclosure taken along line 16A-16A of FIG. 16B.
Figure 16C:
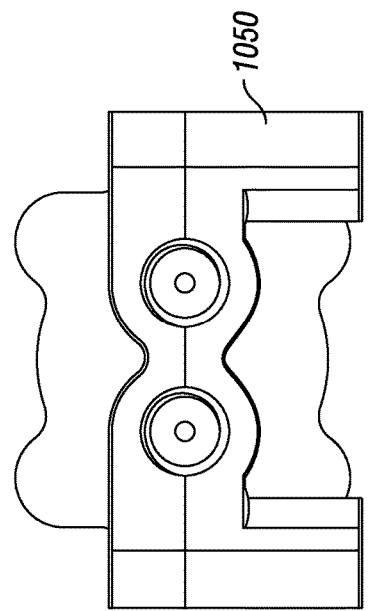
FIG. 16C is a bottom view of the adapter of FIG. 16B.
Figure 16B:
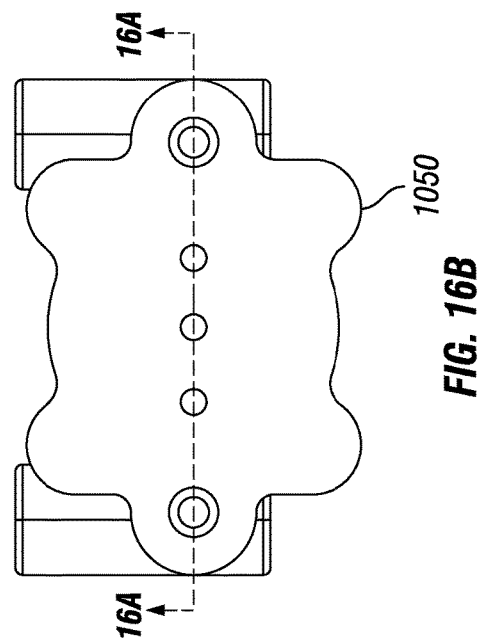
FIG. 16B is a top view of the adapter of FIG. 16A.

FIGS. 16A-16C provide additional details regarding a second base or adapter, such as the base 11 shown in FIG. 3, for example. FIG. 16A provides a cross-sectional view of the adapter taken along line 16A-16A of FIG. 16B. FIG. 16B is a top view of the adapter, and FIG. 16C is a bottom view of the adapter or base.

Figure 17A:
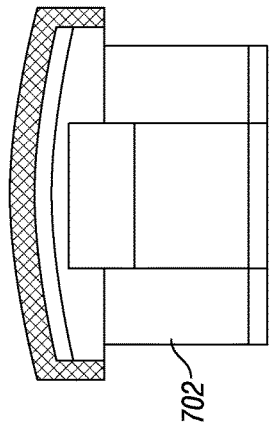
FIG. 17A provides a side view of a cap of a modular sensor in accordance with the present disclosure.
Figure 17B:
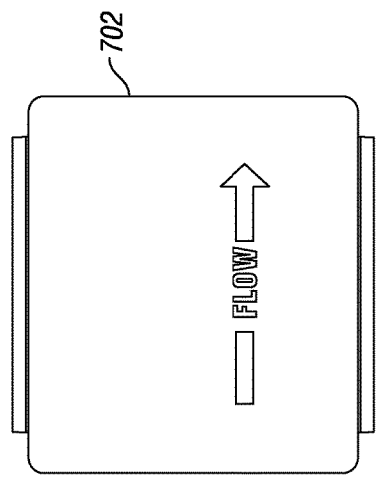
FIG. 17B provides a cross-sectional view of the cap taken along line 17B-17B of FIG. 17A.
Figure 17C:
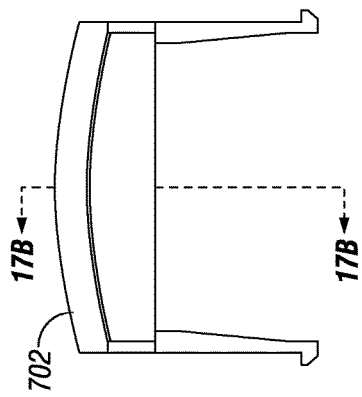
FIG. 17C provides a bottom view of the cap of FIG. 17A.
Figure 17D:
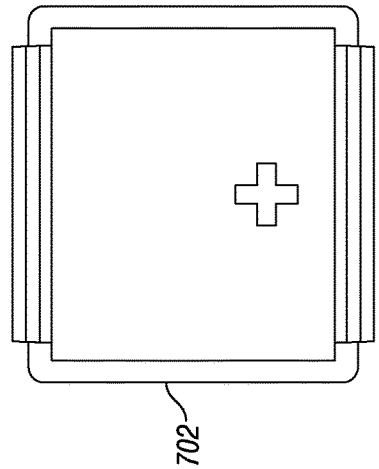
FIG. 17D provides a top view of the cap of FIG. 17A.

FIGS. 17A-17D provide additional views of an alternative embodiment of a cap of a modular sensor in accordance with the present disclosure. FIG. 17A provides a side view of such a cap such as, for example, the cap 702 as shown in FIG. 7. FIG. 17B provides a cross-sectional view of the cap taken along line 17B-17B of FIG. 17A. FIG. 17C provides a bottom view of the cap and FIG. 17D provides a top view of such a cap.

FIGS. 18A-18E provide additional views and details regarding a base, such as the base 703 as shown in FIG. 7, for example. FIG. 18A provides a top view of the base. FIG. 18B provides a cross-sectional view taken along line 18B-18B of FIG. 18A. FIG. 18C provides a bottom view of the base. FIG. 18D provides a cross-sectional view of the base taken along line 18B-18B of FIG. 18A. FIG. 18E is a cross-sectional view of the base taken along line 18E-18E of FIG. 18A. In each of FIGS. 18B, 18D, and 18E, a projection 801 is shown. Those skilled in the art will understand and appreciate that the projection 801 serves as a poka yoke, such as an orientation pin which is of a selected size and shape so that it will only fit in one preselected configuration with an adapter, manifold, or other component. The other component can be adapted so that it provides ports and/or pathways for fluid flow which not only align with those of the base, but also align with the desired direction of flow to go through the modular sensor which includes the base.

Those skilled in the art will appreciate from a review of FIGS. 17A-17D and FIGS. 18A-18E that the cap and base can be adapted so that they provide a snap-fit configuration, which allows for easy assembly and disassembly from one another, as may be desired. In addition, the use of printing and/or graphics on the top of the cap is illustrated. It will be appreciated that the use of the orientation pin 801 may be chosen to match the direction of desired fluid flow in some embodiments of the present disclosure.

Although not shown, it will be appreciated that one or more spacers may be used in combination with the cap and the base shown in FIGS. 17A-17D and 18A-18E, respectively, in connection with a modular sensor system of the present disclosure. For example, a spacer may be used to ensure that the sensor fits snugly against the base in a desired location so that the sensor's leads are at the desired point along the passageway of the base between its input and output ports. A spacer can also be used to ensure that the cap and base fit together as desired, such as to help ensure proper attachment, position the sensor within the cap, and so forth.

Figure 19B:
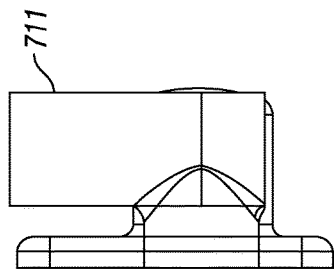
FIG. 19B provides a side view of the adapter of FIG. 19A.
Figure 19D:
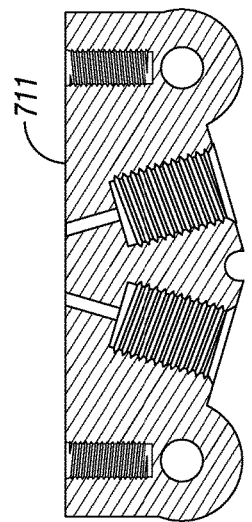
FIG. 19D provides a cross-sectional view of the adapter taken along line 19D-19D of FIG. 19A.
Figure 19A:
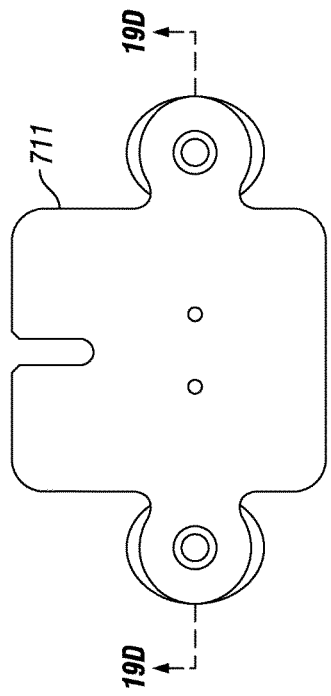
FIG. 19A provides a top view of an adapter of an embodiment of the present disclosure.
Figure 19C:
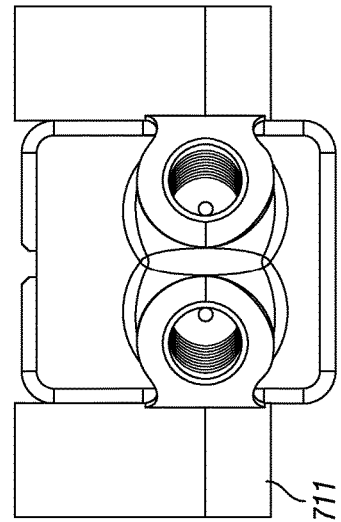
FIG. 19C provides a bottom view of the adapter of FIG. 19A.

FIGS. 19A-19D provide additional views and details regarding an adapter or connector, such as that shown as base 711 in FIG. 9. FIG. 19A provides a top view of the adapter, FIG. 19B provides a side view of the adapter, and FIG. 19C provides a bottom view of the adapter. FIG. 19D provides a cross-sectional view of the adapter taken along line 19D-19D of FIG. 19A.

Referring now to FIG. 20, an alternative embodiment is provided. In FIG. 20, a cross-sectional view of a modular sensor system 2101 is shown. The modular sensor system 2101 includes a cap 2102 and a base 2103. As shown in FIG. 20, the cap 2102 and base 2103 are attached to one another, can be removably or permanently attached in any manner, such as described above. In FIG. 20, the base 2103 is shown attached to a manifold 2105. Both manifold 2105 and base 2103 have passageways extending therethrough which align to allow fluid to flow through both manifold 2105 and base 2103 in a straight or substantially straight flowpath 2120. The flowpath 2120 flows directly past a sensor (not shown in FIG. 20), thus providing a straight (or substantially straight) fluid pathway through the modular sensor system 2101 and past the sensor (not shown) therein. As also shown in FIG. 20, the base 2103 has recesses 2104a, 2104b, 2104c, and 2104d, each of which is adapted to receive and securely hold an o-ring sealing element (not shown in FIG. 20), such as any of those described above. By providing o-ring sealing elements in recesses 2104a-2104d, radial sealing of the base 2103 can be provided. In addition, base 2103 also has recesses 2106a, 2106b, 2106c, and 2106d, each of which is also adapted to receive and securely hold an o-ring sealing element (not shown in FIG. 20), such as any of those described above. The o-ring sealing elements located in recesses 2106a-2106d provide axial sealing of the base 2103 in relation to the manifold 2105.

It will be understood that the modular sensor system of the present disclosure provides a number of advantages and overcomes a number of problems with conventional sensors. First, the modular sensor system protects the sensor and its associated PCB or other electronic components from damage, contamination, static charges/discharges, breakage such as due to being dropped, and the like. In addition, the modular sensor system can be adapted to keep the sensor and its associated electronic components in a fluidtight environment. Second, the modular sensor system has a flow-through design such that the flowpath of the fluid flows past the sensor, which is located near or adjacent the flowpath in the modular sensor system. This design avoids the problems noted above with respect to dead volume and the associated problems of potential contamination of subsequent samples or tests due to mixing of samples and the like. Third, the modular sensor system allows for easy and quick interchangeability. An operator can use, for example, a modular sensor with a flow sensor and then simply disconnect the modular flow sensor from an AI system (for example) and replace it with a modular pressure sensor, for example, that is connected to the same system if so desired. Thus, the operator can easily and quickly change one modular flow sensor for another, with each adapted to be used in the same fluidic system. In another embodiment, a sensor can be located in either the base or cap of a modular sensor, with the corresponding base or cap adapted to be easily replaced by another base or cap containing a different sensor, thus providing interchangeability via the swapping of one of the components of a modular sensor for another corresponding component (e.g., the base or the cap of a modular sensor as described above). For example, a cap containing a flow sensor in a modular sensor could be replaced with a cap containing a pressure sensor in that modular sensor, and vice versa. Similarly, the modular sensor could be adapted so that a base containing a first type of sensor could be replaced with a base containing a second type of sensor, and so forth. A modular sensor system in accordance with the present disclosure is also reusable. For example, the modular sensor system can be installed and connected in a given system, appropriate data from the sensor can be obtained, and the modular sensor system can then be disconnected and removed from the system, and then used again later, either at the same location in the system as before, at a different location in the same system, or in an entirely different fluidics system. Another advantage of the modular sensor system is that the modular sensor can be installed and attached to a component in a fluidics system, such as a pump or between two ports in a manifold or in a valve body, or the like, and can also be later installed elsewhere in the same or a different fluidics system, including at any point along the fluid flow path if an adapter as disclosed herein is used with the modular sensor to allow tubing to be connected to the ports of the adapter and thus the modular sensor (such as between any two discrete components in the system as may be desired).

Still another advantage of the modular sensor system of the present disclosure is its accessibility in use in a wide variety of situations. In at least some embodiments of the modular sensor system, it can be included in a fluidic system between any two points in the fluid pathway, and can be connected to such a system using conventional fittings and without the need for any tools, such as wrenches or the like. Moreover, those skilled in the art will further appreciate that the modular sensor system of some embodiments can be placed in almost any orientation in three-dimensional space as may be desired or convenient for an operator. This means that the modular sensor system in such embodiments can be used in a greater variety of applications and fluidic systems, allowing an operator to connect (or disconnect, as the case may be) a modular sensor system in a complicated fluidic system with much greater ease and convenience. An operator therefore can connect the modular sensor system of the present disclosure in systems in which only a limited space is available in only a particular location if required due to space considerations, and at the same time an operator in the alternative can connect a modular flow sensor of the present disclosure in any location deemed convenient by the operator if multiple options for its location within a system are available. Typically, an operator will choose to add a component to such a fluidic system (such as a modular sensor, for example) in a location which allows for easy access so the operator can easily and quickly connect (and later, disconnect) the component. Those skilled in the art will also appreciate that, the shape, size, and/or location of the two ports relative to each other (e.g., diameter, distance apart, location on the base, etc.) in the bases of two modular sensors in accordance with this disclosure are provided, the two modular sensors can be adapted so that they are easily interchanged with one another in a fluidics system, and may even be used to replace one with another in the same physical location within a given fluidics system.

Those skilled in the art will understand and appreciate that the various components described and shown can be made of a variety of materials, and such materials can vary depending on the characteristics and desired applications. For example, if the modular sensor system is to be used in high pressure applications involving potentially corrosive chemical effluents, acidic or base materials may be desirable depending on the effluent(s) involved, while in other situations, such as those involving either lower pressures or less corrosive or inert effluents, cheaper materials may be more useful and cost effective. In addition, biocompatibility may be important in many situations, and so biocompatible materials such as polyetheretherketone (PEEK), as well as PPS, PEI, PPSU, and/or PSU and the like may be more desirable in such intended applications. Similarly, those skilled in the art will appreciate that the size of the modular sensor system can vary depending on its intended application. In addition, those skilled in the art will understand that the modular sensor system of the present disclosure may be usefully applied in a wide variety of applications, including those involving both high and low flow rates, such as between the range of 0.1 mL/minute or so to 500 mL/minute or so, and those involving a range of pressures, such as pressures in the range from −14.5 psi or so to 200 psi or so. For AI systems and applications, the modular sensor system may be used with much higher pressures (e.g., up to 25,000 psi or so) and with much smaller flow rates (e.g., 1-5 microliters/minute), or even lower (e.g., 1-5 nanoliters/minute).

While the present invention has been shown and described in various embodiments, those skilled in the art will appreciate from the drawings and the foregoing discussion that various changes, modifications, and variations may be made without departing from the spirit and scope of the invention as set forth in the claims. The modular sensor system may include and incorporate more than one sensor. For example, the modular sensor system 1 can include both a pressure and a flow sensor if desired, or any one of a number of types of sensors, such as those listed above. It will be understood and appreciated that references in the disclosure to "top," "bottom," "right" and/or "left" are provided solely with respect to the figures provided to illustrate various embodiments and for the convenience of the reader. Such references are not limiting in any way, as the modular sensor system may be installed, connected, or used in essentially any orientation as may be desired by an operator for a given application. Those skilled in the art will further appreciate that various materials can be used in place of or in addition to those described herein, and that the embodiments shown and described can be used in additional applications and provide additional advantages beyond those set forth herein. Hence, the embodiments shown and described in the drawings and the above discussion are merely illustrative and do not limit the scope of the invention as defined in the claims herein. The embodiments and specific forms, materials, and the like are merely illustrative and do not limit the scope of the invention or the claims herein.

We claim:

1. A modular sensor for use in a fluidic system comprising:
    a sensor;
    a cap enclosing said sensor and electronic circuitry coupled to said sensor, wherein said cap includes a recessed rectangular area adapted to receive at least one output wire for providing signals from said sensor; and
    a base attached to said cap, wherein said base has an input port and an output port, each of which are adapted to have tubing connected thereto, and wherein said base further comprises a first passageway adapted to allow fluid to flow from the input port past at least a portion of said sensor and to the output port of said base, and wherein said base is adapted to be removably attached in an analytical instrument system.

2. The modular sensor according to claim 1 wherein said sensor comprises at least one or more of the following: fluid flow, pressure, temperature, pH, optical, micro-electro-mechanical systems sensor, humidity, position, motion, or biosensor sensor.

3. The modular sensor according to claim 2 wherein said sensor comprises a printed circuit board.

4. The modular sensor according to claim 1 wherein said base comprises a biocompatible material.

5. The modular sensor according to claim 4 wherein said base comprises polyetheretherketone.

6. The modular sensor according to claim 1 wherein said base further comprises a plurality of holes adapted to receive screws for attaching said base to said cap with a plurality of screws.

7. The modular sensor according to claim 1 wherein said cap and said base are adapted to removably attach to one another with a snap fit mechanism.

8. The modular sensor according to claim 1 wherein said cap and said base are attached to one another by an adhesive.

9. The modular sensor according to claim 1 wherein said cap and said base are attached to one another by a polymer.

10. The modular sensor according to claim 1 wherein said cap and said base are attached to one another by ultrasonic welding.

11. The modular sensor according to claim 1 wherein said base further comprises either printing or graphics identifying at least the input port as an input port.

12. The modular sensor according to claim 1 wherein said sensor is electrically coupled to said at least one output wire with a plug connection, and said wire extends outside a portion of said cap.

13. The modular sensor according to claim 1 wherein the input port and output port of said base, the first and second passageways in said base, and the input and output ports of said cap and the passageway therethrough define a convex fluid flow path.

14. The modular sensor according to claim 1 wherein the passageway between the input port and the output port of said base is substantially straight.

15. The modular sensor according to claim 1 wherein the passageway between the input port and the output port of said base defines a serpentine path.

16. The modular sensor according to claim 1 wherein at least a portion of said cap is overmolded to encapsulate at least a portion of a perimeter edge of said sensor.

17. The modular sensor according to claim 1 wherein at least a portion of said cap is overmolded to encapsulate substantially all of a perimeter of said sensor.

18. The modular sensor according to claim 1 wherein at least a portion of said cap is formed by 3D printing and encapsulates at least a portion of an edge of said sensor.

19. The modular sensor according to claim 1 further comprising a poka yoke feature.

20. The modular sensor according to claim 19 wherein the poka yoke feature comprises an orientation projection from said base, wherein the orientation is adapted to fit in only one desired configuration with an adapter, manifold, or other component.

21. The modular sensor according to claim 1 wherein the poka yoke feature comprises and orientation projection from said base, wherein the orientation projection is adapted to fit with another component in only one desired configuration to thereby align a fluid flowpath in said base with a fluid flowpath in the component.

22. The modular sensor according to claim 1 further comprising an adapter, wherein said adapter has a first input port in communication with a first passageway and a first output port and a second input port in communication with a second passageway and a second output port, and wherein said adapter is adapted so that when said adapter is attached to said base, the first output port of said adapter is in communication with the input port of said base and the output port of said base is in communication with the second input port of said adapter.

23. A biocompatible sensor module comprising:
a first sensor having electronic circuitry coupled thereto and adapted to sense a condition and provide an output signal thereof, and having a perimeter;
a second sensor;
a biocompatible cap covering said first sensor and second sensor, and the electronic circuitry coupled to said first sensor and second sensor; and
a biocompatible base attached to said cap, wherein said base has an input port and an output port, each of which are adapted to have tubing removably connected thereto, and wherein said base further comprises a first passageway adapted to allow fluid to flow from the input port of said base to a portion of said first sensor and then to the output port of said base, and wherein at least a portion of said cap encapsulates at least a portion of said first sensor and second sensor that is proximal a perimeter portion of said first sensor, and wherein said base is adapted to be removably attached in a fluid pathway of a system.

24. The biocompatible sensor module according to claim 23, wherein said second sensor is a flow sensor and said first sensor is a pressure sensor.

25. The biocompatible sensor module according to claim 23, wherein said first sensor is adapted to provide an output signal corresponding to a first condition and said second sensor is adapted to provide and output signal corresponding to a second condition.

* * * * *